United States Patent [19]

Lewcock et al.

[11] Patent Number: 4,483,509
[45] Date of Patent: Nov. 20, 1984

[54] GUILLOTINE VALVE ASSEMBLY

[76] Inventors: Ronald B. Lewcock, 12982 Nicollet Ave. S., Burnsville, Minn. 55337; James D. Lyons, 445 E. Arlington Ave., St. Paul, Minn. 55101

[21] Appl. No.: 390,324

[22] Filed: Jun. 21, 1982

[51] Int. Cl.³ .............................................. F16K 25/00
[52] U.S. Cl. ...................... 251/86; 251/112; 251/158; 251/203; 251/231; 251/328; 251/329
[58] Field of Search ................. 251/86, 112, 193, 158, 251/203, 204, 231, 328, 329

[56] References Cited

U.S. PATENT DOCUMENTS

| | | | |
|---|---|---|---|
| 1,525,216 | 2/1925 | Wyman | 251/112 |
| 1,630,133 | 5/1927 | Murphy | 251/231 |
| 1,918,184 | 7/1933 | Hartman | 251/231 X |
| 2,873,943 | 2/1959 | Williams | 251/328 X |
| 3,141,649 | 7/1964 | Baxter | 251/193 X |
| 3,258,244 | 6/1966 | Hilton | 251/203 |
| 3,598,364 | 8/1971 | Grenier | 251/231 X |
| 3,722,857 | 3/1973 | Townsend | 251/203 |
| 4,221,307 | 9/1980 | Peterson | 251/328 |
| 4,294,427 | 10/1981 | Cilny | 251/86 |

Primary Examiner—Harold W. Weakley
Attorney, Agent, or Firm—Burd, Bartz & Gutenkauf

[57] ABSTRACT

A valve assembly for controlling the flow of fluid has a housing defining a valving chamber accommodating a transversely movable valve plate. A manually operated lever connected to the valve plate with a rod is operable to move the valve plate between open and closed positions. A resilient member mounted on the housing within the chamber surrounds the fluid outlet opening in the chamber. Rails secured to the housing cooperate with the valving member to hold the valving member in sealing engagement with the resilient member when the valving plate is in the closed position. The valving plate may be connected with a remotely located actuator lever mounted on a tubular member secured to the valve housing.

26 Claims, 10 Drawing Figures

GUILLOTINE VALVE ASSEMBLY

FIELD OF THE INVENTION

The invention relates to a material flow control device. The device is a valve assembly having a valving member retained in a sealed closed position and movable to an open position.

BACKGROUND OF THE INVENTION

Machines for pumping material, as liquid manure, have power driven impeller pumps that deliver liquid manure under pressure to discharge pipes. Gate valves mounted in the pipes are used to control the flow of liquid manure through one or more pipes. Johnson in U.S. Pat. No. 3,905,725 shows a material control flow valve having a housing and a movable valve plate located within a chamber in the housing. Paulson et al in U.S. Pat. No. 4,284,371 shows a pair of valve assemblies associated with the outlet of a pump. Each valve assembly has a movable valving plate operably connected to a hand-operated lever. The lever is manually operable to move the valve plate between its open and closed positions. The lever is connected to a rod mounted on a housing having a chamber accommodating the valving plate. The valving plate fits between the walls of the housing so that the walls guide the plate between its open and closed positions. The valving plate has a relatively loose sliding fit with respect to the walls so that it can be moved with the hand-operated lever. When the valving plate is in the closed position, it does not seal the fluid flow passage through the valve housing. Thus, the valve assembly leaks when the valving member is closed. The amount of leakage of the fluid, as liquid manure, through the closed valve increases as the valve plate wears. In use, materials, as liquids and solids, can accumulate in the chamber between the valve plate and end wall of the housing. This material makes it difficult to completely open the valve plate and at times prevents the valve plate from being moved to its open position. The valve chamber must be drained and cleaned out to return the valve assembly to its normal operating condition. The guillotine valve assembly of the invention obviates the disadvantages of the prior gate valves.

SUMMARY OF INVENTION

The invention is directed to a valve assembly having a valving member movable to a sealed closed position and a full open position.

According to the invention, there is provided a valve assembly having housing means including a valving chamber and inlet and outlet openings in communication with the chamber to allow fluid to flow through the valve assembly. Valving means located in the chamber is transversely movable to open and closed positions to control the flow of fluid in the chamber and openings. Means, such as a lever, is operable to move the valving means between its open and closed positions. Resilient means is mounted on the housing means within the chamber. The resilient means surrounds one of said openings. Means within the chamber are engaged by the valving means to hold the valving means in engagement with the resilient means when the valving means is in the closed position. The valving means moves away from the resilient means when it is moved from the closed position to the open position.

The preferred embodiment of the valve assembly of the invention has a housing means comprising a body having an open portion and an inlet opening and a cover closing the open portion having an outlet opening. A resilient sheet, such as rubber, is bonded to the cover. The sheet surrounds the outlet opening and serves as a seal between the body and cover. A valve plate located in the chamber is moved from an open position to a closed position in sealing engagement with the resilient sheet to close the outlet opening. The valve plate has a transverse member that rides on inclined rail means secured to the body within the chamber. Movement of the valve plate to the closed position wedges the plate into engagement with the resilient sheet.

A valve actuator operates to move the valve plate between its open and closed position. A connection between the actuator and valve plate allows the valve plate to move away from the resilient sheet when it is moved to the open position. The connection also allows the valve plate to move laterally and rock and tilt on the rail means. The valve plate freely moves to the open position as soon as it disengages the resilient sheet. This is a break-away movement as the resilient sheet functions as a biasing means forcing the valving plate toward the rail means. The acutator includes a rod mounted on a bearing assembly secured to the body. A releasable lock means associated with the bearing assembly is used to hold the rod in a fixed position thereby locking the position of the valve plate relative to the body and cover. The valve plate can be locked in any selected position from closed to full open.

In use, when the valve plate is in the full open position it does not interfere with the flow of fluid, such as liquid manure, through the inlet and outlet passages of the valve assembly. Fluid and solids do not lodge in the valve chamber preventing actuation of the valving plate. The inclined rail means guides the valving plate into tight engagement with the resilient sheet thereby sealing the outlet opening with the valve plate. When the valve plate in in its closed and sealed position fluid does not leak through the valve assembly.

A remote actuator can be used to transversely move the valve plate between its open and closed positions. The remote location of the actuator allows the valve assembly to be used in places, such as in pits, confined spaces, behind walls, and underground. An elongated tubular member attached to the valve housing accommodates a valve actuator rod. A manually operated lever means mounted on the end of the tubular member remote from the valve assembly is connected to the rod. In use, the lever means is moved to move the valve plate between its open and closed positions.

IN THE DRAWINGS

DESCRIPTION OF PREFERRED EMBODIMENT

Figure 1:
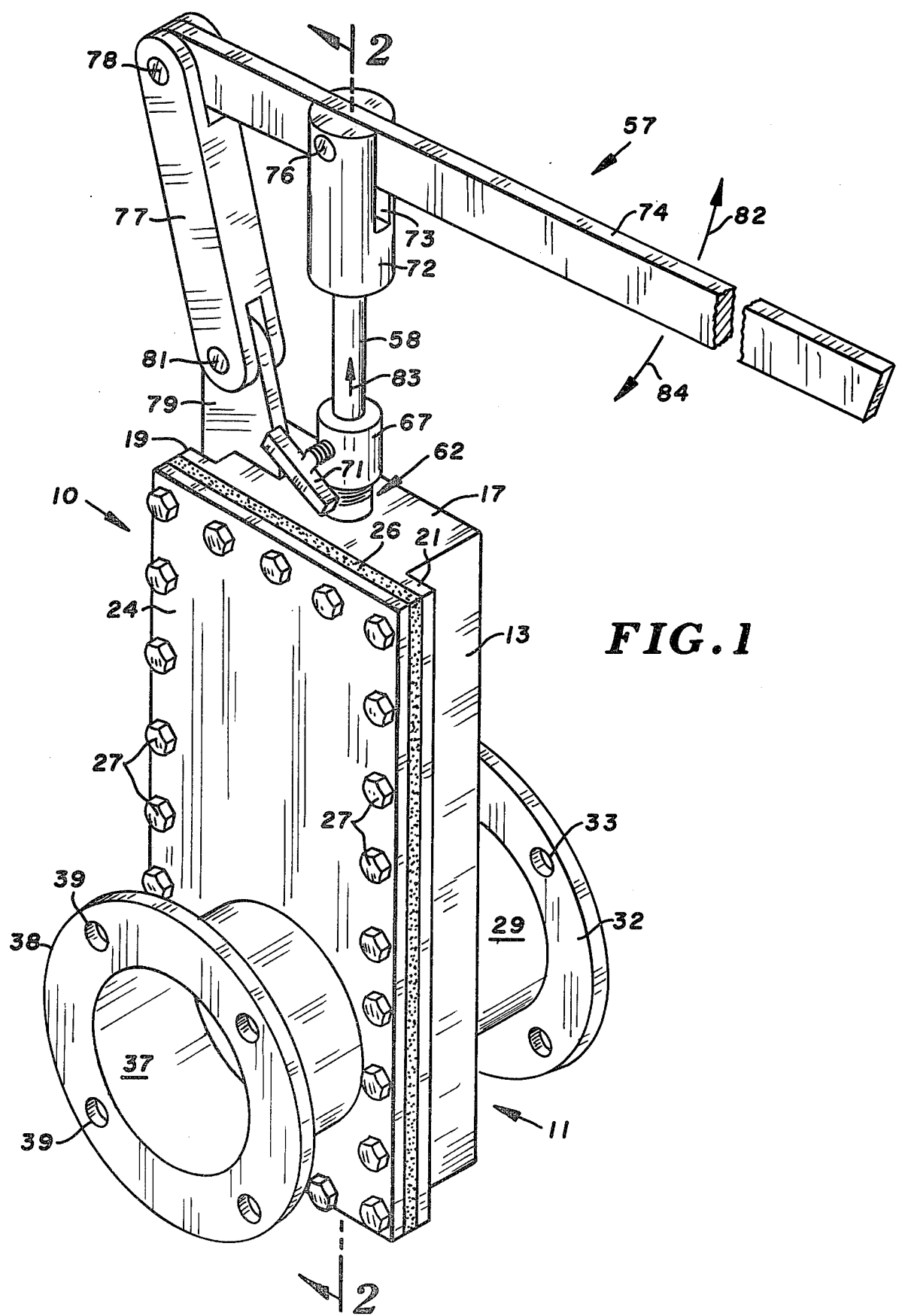
FIG. 1 is a perspective view of the guillotine valve assembly of the invention.
Figure 2:
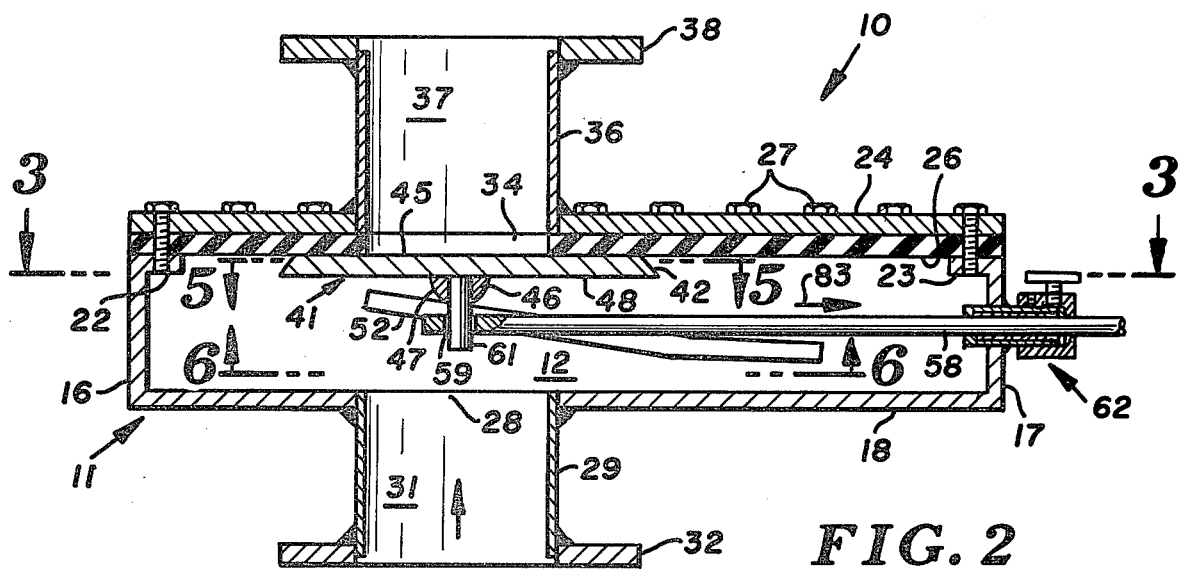
FIG. 2 is a reduced scale sectional view taken along the line 2—2 of FIG. 1.

Referring to FIGS. 1 and 2, there is shown the guillotine valve assembly of the invention indicated generally at 10. Valve assembly 10 is useable with tubular members, such as pipes, conduits, tubes, and like lines, to control the flow of fluids, such as gas, liquids, and semi-solids, through the tubular members. Valve assembly 10 is useable with a pump, such as the liquid manure pumps shown in U.S. Pat. Nos. 3,905,724 and 4,284,371, to control the flow of fluid moved by the pumps.

Figure 5:
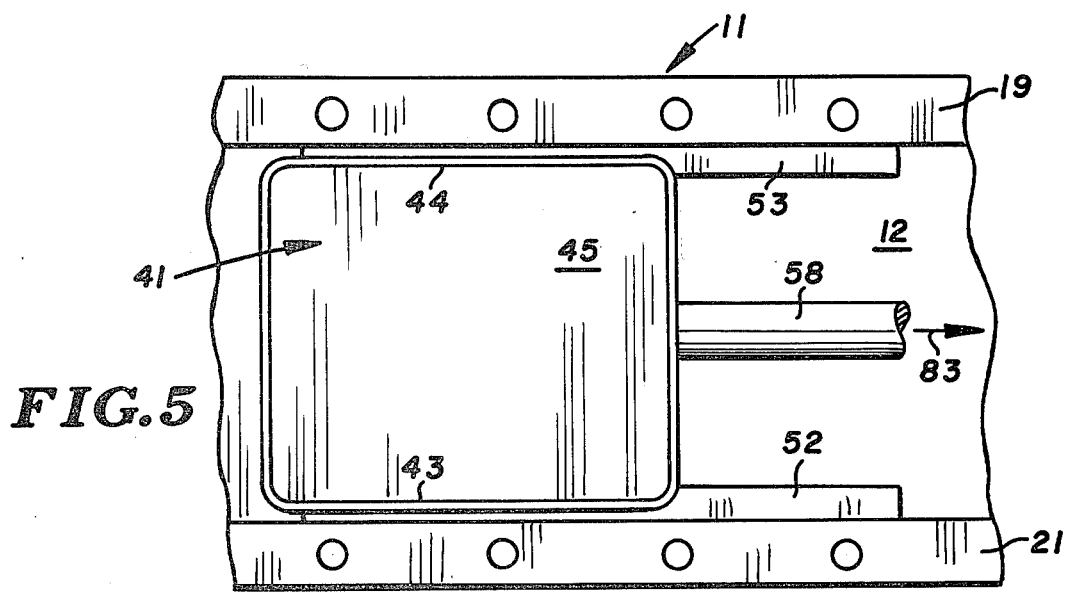
FIG. 5 is an enlarged sectional view taken along the line 5—5 of FIG. 2.

Valve assembly 10 has a generally rectangular housing or body 11 surrounding a valving chamber 12. Body 11 has flat side walls 13 and 14 joined to transverse end walls 16 and 17. Walls 13-17 are secured to a generally flat bottom wall 18. Referring to FIGS. 1, 2 and 5, the side walls 13 and 14 have outwardly directed top linear flanges 19 and 21 located in the same plane as inwardly directed flanges 22 and 23 on the top edges of end walls 16 and 17. Flanges 19, 21, 22, and 23 have generally flat top surfaces located in the same plane and support a cover or top wall 24. A flexible sheet 26 of resilient material is located between top wall 24 and flanges 19, 21, 22, and 23. A plurality of bolts 27 projected through holes in cover 24 and flexible sheet 26 are threaded into threaded holes in flanges 19, 21, 22, and 23 to secure top wall 24 and sheet 26 to the flanges. Nut and bolt assemblies can be used to attach the top wall to flanges 19 and 21. The flexible and resilient sheet 26 is preferably a one-piece Neoprene rubber sheet member that is bonded to the inside surface of cover 24. A thermo bonding process is used to secure the entire outside surface of sheet 26 to the adjacent surface of cover 24 in a manner so that it does not peel from cover 24. The rubber sheet member extends all the way to the outside lateral edges of cover 24 and serves as a continuous peripheral gasket between flanges 19, 21, 22, and 23 and cover 24.

As shown in FIG. 2, bottom wall 18 has a circular opening 28 open to valve chamber 12. A tubular member or short pipe 29 is secured to bottom wall 18 by welds or the like. Tubular member 29 has a cylindrical passage 31 in alignment with opening 28. The outer end of tubular member 29 is secured to an annular generally flat ring 32. As shown in FIG. 1, ring 32 has a plurality of holes 33 to accommodate nut and bolt assemblies used to attach the ring to a pipe or conduit. Cover 24 has a circular opening 34 in alignment with the opening 28. A tubular member or pipe 36 is secured to cover 24 by welds or the like. Tubular member 36 has a cylindrical outlet passage 37 aligned with opening 34. An annular generally flat ring 38 is secured to the outer end of tubular member 36. As shown in FIG. 1, ring 38 has a plurality of holes 39 to accommodate nut and bolt assemblies used to attach the ring to an outlet or discharge pipe or conduit.

Figure 6:
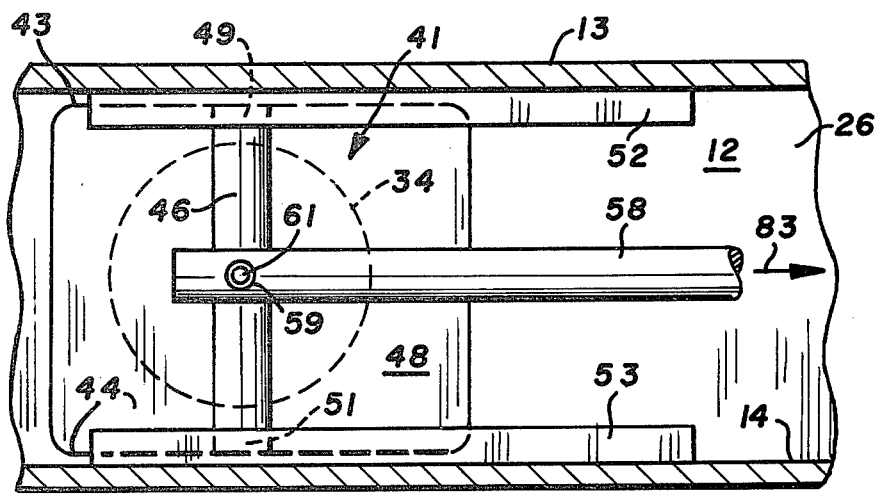
FIG. 6 is an enlarged sectional view taken along the line 6—6 of FIG. 2.
Figure 7:
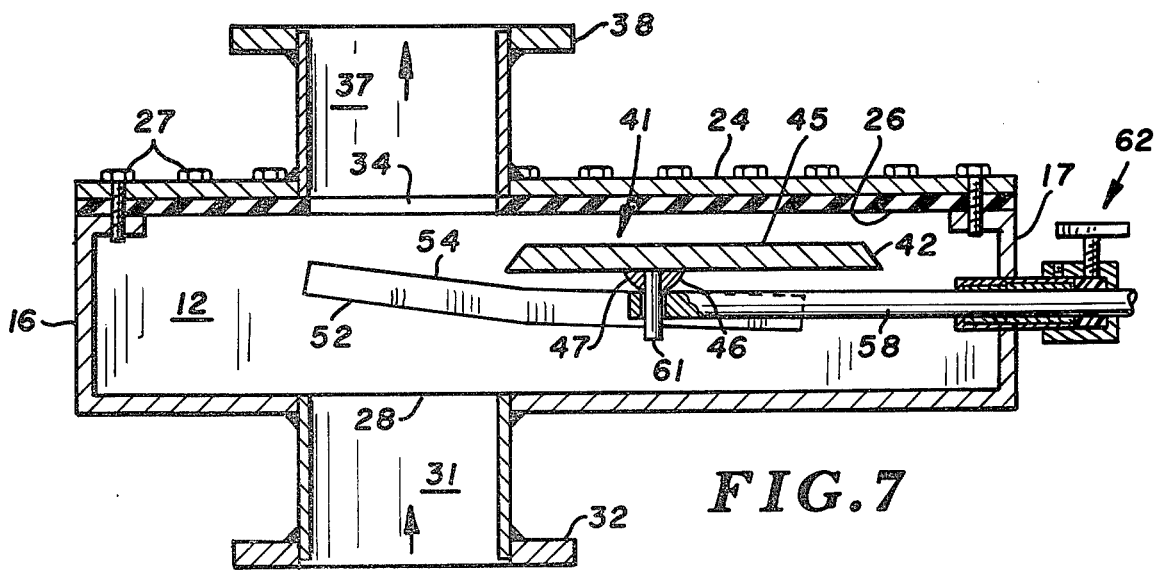
FIG. 7 is a sectional view similar to FIG. 2 showing the valve plate in the open position.

The flow of fluid through valve assembly 10 is controlled with a movable gate or valve plate indicated generally at 41. Valve plate 41 movably disposed within valving chamber 12 is locatable in a closed position, as shown in FIG. 2, and an open position, as shown in FIG. 7. Valve plate 41 can be located and retained in positions intermediate between its open and closed positions. As shown in FIG. 5, valve plate 41 has an upwardly and inwardly tapering outer edge 42 and a generally flat upper or first surface 45. Plate 41 has linear side edges 43 and 44, as shown in FIG. 6, spaced from and located generally parallel to the inside surfaces of side walls 13 and 14, respectively. Plate 41 has length and width dimensions that are greater than the diameter of opening 34 so that, when plate 41 is in the closed position, the first surface 45 is located in sealing surface engagement with the portion of the flexible sheet 26 that surrounds opening 34.

Figure 3:
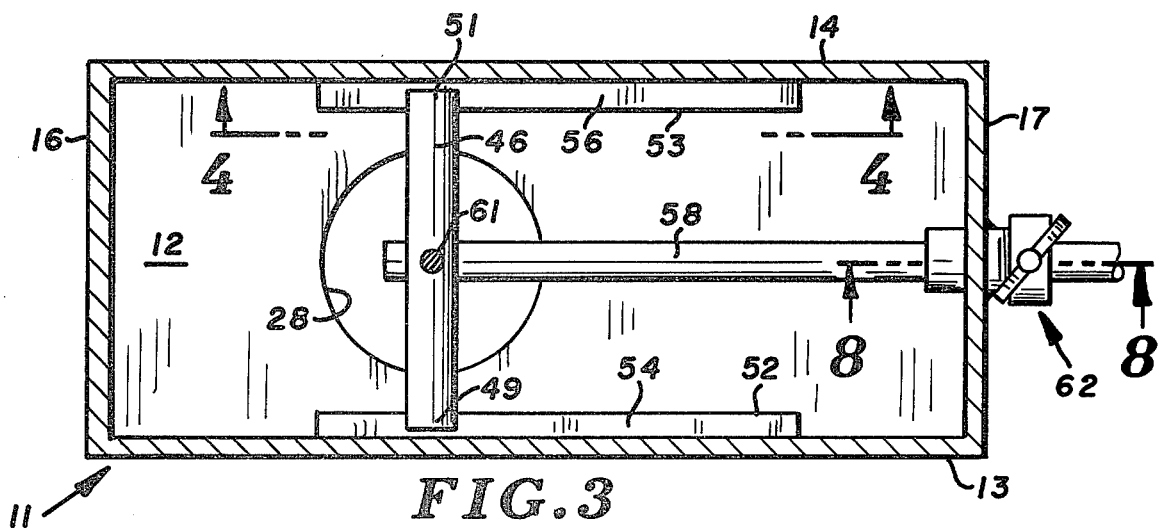
FIG. 3 is a sectional view taken along the line 3—3 of FIG. 2.
Figure 4:
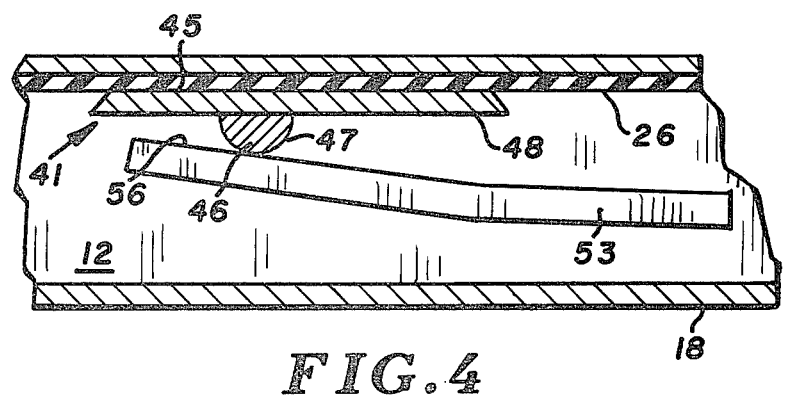
FIG. 4 is an enlarged sectional view taken along the line 4—4 of FIG. 3.

As shown in FIGS. 2, 3, 4, and 6, a transverse rib 46 extends across and is secured to the mid-portion of plate 41. Rib 46 is attached to the bottom or second surface 48 of plate 41 with welds or bolts. Rib 46 has a generally semi-circular outer surface 47 and opposite ends 49 and 51 located adjacent edges 43 and 44. As shown in FIG. 3, ends 49 and 51 ride on rails 52 and 53 secured to the side walls 13 and 14, respectively, and projected into the chamber 12. As shown in FIG. 4, rail 53 has an upwardly curved top surface 54. Rail 53 has a similarly curved top surface 56. The upwardly curved portions of rails 52 and 53 are located on opposite sides of the flow axis of holes 28 and 34. The rails 52 and 53 extend toward the end wall 17 and support valve plate 41 during its movement between its open and closed positions. Rails 52 and 53 extend in an upward direction between 3 degrees and 10 degrees with respect to a longitudinal or horizontal plane of housing 11. Preferably each rail 52 and 53 has a 5-degree upwardly and rearwardly incline. The rails can have other angles in inclination.

Valve plate 41 is moved between its open and closed positions with a manually-actuated actuator indicated generally at 57. Actuator 57 includes a linear rod 58 extended into valve chamber 12 and operably connected to valve plate 41. As shown in FIGS. 2 and 6, the inner end of rod 58 has a hole 59 accommodating a downwardly directed pin 61. Pin 61 is connected to the mid-portion of rib 46. Hole 59 has a diameter slightly larger than pin 61 to allow valve plate 41 to move up and down and have slight lateral and tilting movement.

Figure 8:
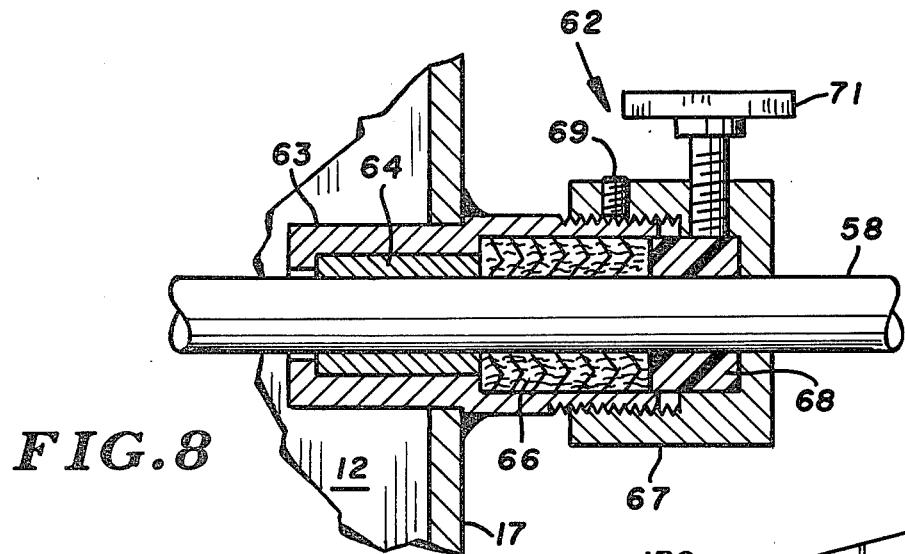
FIG. 8 is an enlarged sectional view taken along the line 8—8 of FIG. 3.

Rod 58 is slidably supported in a bearing and seal assembly indicated generally at 62 mounted on the mid-portion of the front end wall 17 of housing 11. As shown in FIG. 8, bearing and seal assembly 62 has an inwardly directed cylindrical boss 63 surrounding a first sleeve bearing 64 slidably accommodating rod 58. Boss 63 has a central chamber accommodating a plurality of annular seals or packing 66. A cap surrounding rod 58 and mounted on the outer portion of boss 63 accommodates a second sleeve bearing or plastic bushing 68 slidably supporting rod 58. A bolt 69 secures cap 67 in an adjusted position on sleeve 63. Cap 67, as shown in FIG. 8, accommodates a manually operated lock bolt 71 operable to lock rod 58 in a fixed position relative to housing 11. Bolt 71 bears against bushing 68 and is used to force the bushing into tight engagement with rod 58 to lock the rod in a fixed position.

Returning to FIG. 1, a head 72 is secured to the outer end of rod 58. Head 72 has a slot 73 accommodating an elongated linear lever 74. A pin pivotally connects lever 74 to head 72. The short end of lever 74 is connected to a link 77 with a fulcrum pin 78. Link 77 is attached to an ear or bracket 79 secured to housing 11 with a pin 81. Lever 74 is manually moved, as indicated by arrow 82, to move valve plate 41 to an open position. The rod 52 moves in the direction of the arrow 83. With the valve plate 41 in the closed position, as shown in FIG. 2, initial movement of rod 58 in the direction of the arrow 83 will cause the valve plate 41 to drop or break away from flexible sheet member 26. Rod 58 pulls on pin 61 and slightly rocks rib 46 on rails 53 and 54. This aids the break-away movement of plate 41 during initial movement of valve plate 41 from the closed to the open position thereof. The continued movement of the rod 58 will move valve plate 41 along rails 52 and 53 with the opposite ends of the rib 46 riding on the rails. Valve plate 41 freely moves to the open position in the right portion of valve chamber 12, as shown in FIG. 7. Pin 61, being smaller than hole 59, allows valve plate 41 to have limited lateral, rocking and up and down movements. This prevents valve plate 41 from binding and facilitates relatively free movement of valve plate 41 between its open and closed positions.

The material in valve chamber 12 is free to flow through outlet passage 37. When valve plate 41 is in the open position, fluid flows into and out of valve chamber 12. This continuous flow of fluid washes the chamber and prevents accumulation of undesirable material in valve chamber 12. Valving plate 41 is kept relatively clean so that it can be moved to the sealed closed position. Different types of levers and other actuators, as air and hydraulic cylinders, can be used to move valving plate 41 to its open and closed positions.

Valve plate 41 is moved to a closed position by moving lever 74 toward valve housing 11 in the direction of arrow 84. Rod 52 linearly moves into valving chamber 12, as it is supported on the sleeve bearings 64 and 68 of the bearing and seal assembly 62. Valve plate 41 is guided upwardly into tight sealing engagement with resilient sheet member 26. The ends 49 and 51 of the rib 46 bear against the inclined surfaces 54 and 56 of rails 52 and 53 to firmly hold valve plate 41 in a closed position. The additional force can be applied to lever 74 to wedge valve plate 41 in the closed position, since the rails 52 and 53 are inclined in an upward direction. The resilient sheet member 26 is compressed so that it functions as a biasing member holding the rib 46 in firm engagement with the rails 52 and 53.

As shown in FIGS. 2, 3, and 6, when valve plate 41 is in the closed position, rib 46 is located in a plane that passes through the central axis of outlet passage 37. Substantially equal closing force or pressure is applied to valve plate 41 with centrally located rib 46, so that it is retained in sealing relation with resilient sheet member 26 all around passage 37. The sealing pressure of valve plate 41 against sheet member 26 is substantially equal all around passage 37, whereby the valve assembly does not leak fluid when closed.

Valve plate 41 is slightly longer in the direction of rod 58. In the event resilient sheet member 26 wears or erodes, the valve plate 41 is moved further up rails 52 and 53 to compensate for the wear. The length of valve plate 41 in the direction of rod 58 is such that passage 37 will be closed, notwithstanding considerable wear of resilient sheet member 26.

Figure 9:
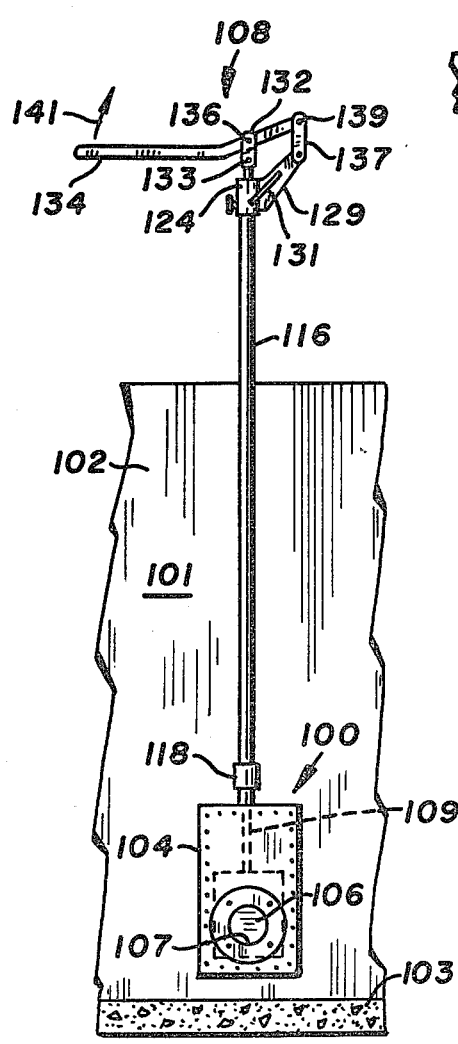
FIG. 9 is an elevational view of the valve assembly of the invention equipped with a remote actuator.
Figure 10:
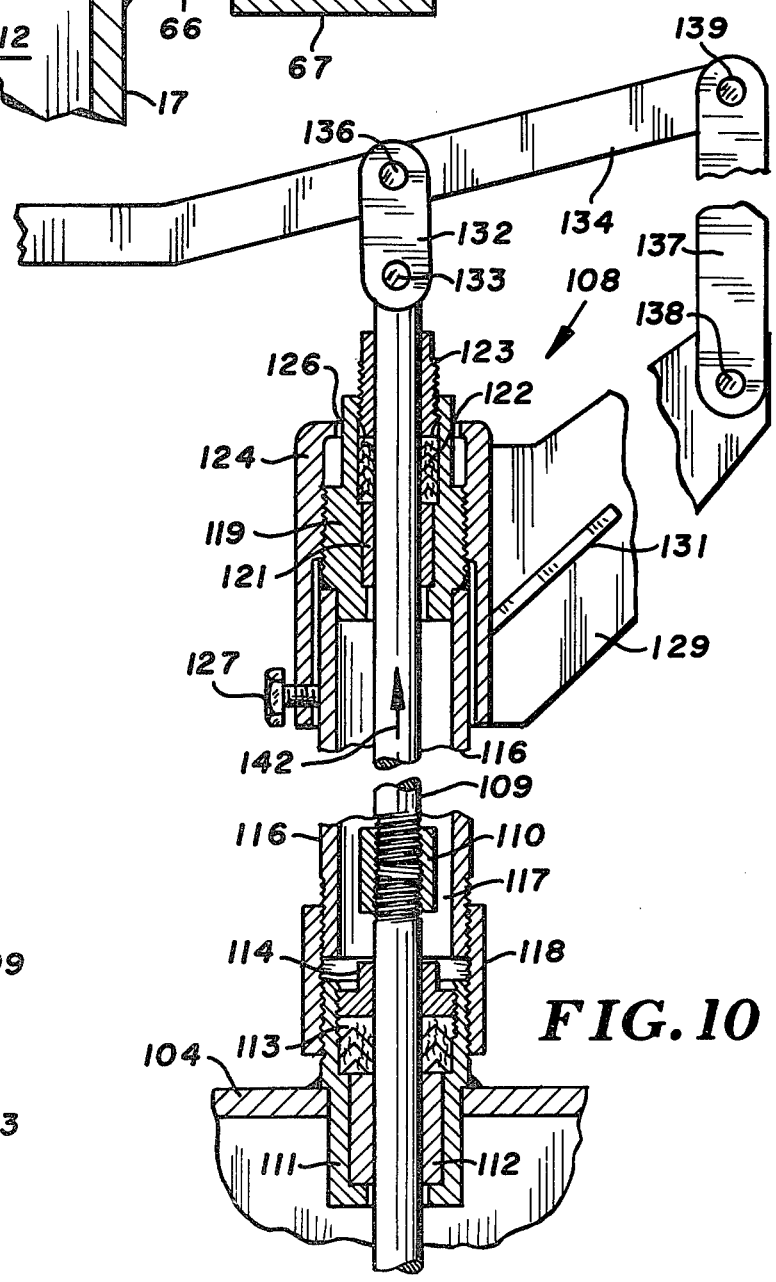
FIG. 10 is a foreshortened longitudinal sectional view of the remote actuator of FIG. 9.

Referring to FIGS. 9 and 10, there is shown the valve assembly of the invention indicated generally at 100 located adjacent the bottom of a pit 101. The pit 101 is defined by an upright side wall 102 and a bottom wall 103. The lower portion of side wall 102 has an outlet or drain pipe (not shown) providing a drain for the liquid material, such as liquid manure, in pit 101.

Valve assembly 100 is identical to valve assembly 10, shown in FIGS. 1–10, and includes a generally rectangular shaped box housing 104 accommodating a transversely movable valve plate 106. Housing 104 has a material inlet passage 107 open to pit 101. The opposite side of the housing has an outlet passage in communication with the drain pipe.

An actuator indicated generally at 108 located above the top of pit 101 is used to open and close the valve plate 106. Actuator 108 is coupled to the valve plate 106 with an elongated linear actuator rod 109. As shown in FIG. 10, actuator rod 109 extends into housing 104 through a cylindrical boss 111 welded to the end of housing 104. Boss 111 accommodates a cylindrical sleeve bearing 112 and a seal or packing 113. An annular member or compression nut 114 threaded into boss 111 retains the packing 113 about rod 109.

An elongated upright tubular member or pipe 116 having a longitudinal passage 117 is attached to cylindrical boss 111 with a coupling 118. Pipe 116 extends above the top of pit 110, as shown in FIG. 9. An adapter 119 is secured to the top of pipe 116. Adapter 119 accommodates a sleeve bearing 121 and seal or packing 122 surrounding the upper end of rod 109. A compression nut 123 threaded into the upper end of adapter 119 retains packing 122 about rod 109. A tubular cap 124 having an open end 126 is located about and threaded into adapter 119. A lock bolt 127 holds cap 124 in a selected rotational position relative to adapter 119 and pipe 116. An arm 129 extends outwardly and upwardly from cap 124. An arm 129 secured by welds to cap 124 is reinforced with a gusset 131. When lock bolt 127 is released, cap 124 and arm 129 can be rotated about the longitudinal axis of rod 109.

A head 132 is attached with a pin 133 to the upper end of rod 109. The upper end of head 132 is pivotally connected to the mid-section of a lever 134 with a pin 136. The lever 134 has an end joined to a link 137 with a pin 139. The lower end of link 137 is attached with a pin 138 to the outer end of arm 129. Lever 134 is a remote actuator that is manually moved to selectively open and close valve assembly 101. When lever 134 is moved in an upward direction, as indicated by arrow 141, in FIG. 9, the rod 109 moves upwardly, as shown by arrow 142 in FIG. 9. This moves valve plate 106 from the closed position to its open position allowing the liquid in pit 101 to drain through the valve assembly and outlet pipe. Valve assembly 100 is closed by moving lever 134 in a downward direction. This moves rod 101 downwardly and forces the valving plate 106 to its closed position, as shown in FIG. 2.

Remote actuator 108 allows the valve assembly 101 to be located in locations, such as the bottom of a pit. The pit can have considerable length, as additional lengths of pipe 116 and rod 109 can be utilized to locate actuator lever 134 in a desired location. Rod 109 has two or more sections connected together with a threaded coupling 110, shown in FIG. 10. Pipe 116 can have two or more sections connected together with threaded couplings.

While there has been shown and described the preferred embodiments of the guillotine valve assembly and actuators for the valve assembly of the invention, it is understood that changes in the structure, size of the valves, and the actuator structures may be made by those skilled in the art without departing from the invention. The invention is defined in the following claims.

The embodiments of the invention in which an exclusive property or privilege is claimed are defined as follows:

1. A valve assembly comprising: housing means having a valving chamber and an inlet opening and outlet opening in communication with the chamber, each opening having a fluid flow passage with a fluid flow axis, said housing means includes a body having laterally spaced side walls, end walls, and a first wall secured to the side walls and end walls, said first wall having said inlet opening, said side walls and end walls surrounding said valving chamber, a second wall mounted on the side walls and end walls closing said valving chamber, said second wall having the outlet opening, valving means located in said chamber movable generally transverse of the fluid flow axis between an open position allowing fluid to flow through said chamber, means for moving the valving means generally transverse of the fluid flow passage between said open and closed positions thereof, resilient means on said housing means within said chamber surrounding one of said openings, said resilient means being a sheet of resilient material bonded to the second wall and surrounding the outlet opening, resilient material having a continuous outer peripheral portion interposed between the second wall and side walls and end walls whereby the second wall is mounted in sealed relation relative to the body, said sheet of resilient material having a continuous outer peripheral portion interposed between the second wall and side walls and end walls whereby the second wall is mounted in sealed relation relative to the body, and means in said chamber engageable with said valving means for moving the valving means into engagement with said resilient means when the valving means is transversely moved to the closed position and allowing the valving means to move away from the resilient means on transverse movement of the valving means to the open position thereof.

2. The valve assembly of claim 1 wherein: the valving means includes a plate having a generally flat surface engageable with the sheet of resilient material when the valving means is in the closed position.

3. The valve assembly of claim 2 wherein: the means in the chamber engageable with the valving means comprise rail means secured to the side walls below said outlet opening, said rail means having portions inclined toward said outlet opening, said valving means having means engageable with the rail means whereby the valving means rides on the rail means during movement to its closed position.

4. The valve assembly of claim 3 wherein: said means engageable with the rail means have convex curved surfaces located in sliding engagement with the rail means.

5. The valve assembly of claim 4 wherein: the means for moving the valving means includes rod means, connecting means joining the rod means to the valving means, and means slidably mounting the rod means on the body.

6. The valve assembly of claim 5 including: releasable lock means mounted on the means slidably mounting the rod means to hold the rod means in a fixed position relative to the housing means.

7. The valve assembly of claim 5 wherein: the connecting means has limited lost motion allowing the valving means limited movement when in the open position.

8. The valve assembly of claim 1 wherein: said means for moving the valving means includes rod means connected to the valving means, means slidably mounting the rod means on the housing means, releasable lock means mounted on the means slidably mounting the rod means to hold the rod means in a fixed position relative to the housing means thereby holding the valving means in a fixed position, and means connected to the rod means operable to move the rod means when the lock means is released thereby moving the valving means between the open and closed positions thereof.

9. The valve assembly of claim 8 wherein: the means operable to move the rod means includes lever means pivotally connected to the rod means, and means pivotally connecting the lever means to said housing means.

10. The valve assembly of claim 1 wherein: the means in the chamber engageable with the valving means comprise rail means secured to the housing means, said rail means having portions inclined toward said one of said openings whereby on movement of the valving means to its closed position the valving means is moved into engagement with the resilient means.

11. The valve assembly of claim 10 wherein: said valving means includes means having convex surfaces engageable with the rail means.

12. The valve assembly of claim 11 wherein: the means for moving the valving means includes connecting means having limited lost motion allowing the valving means limited movement when in the open position.

13. The valve assembly of claim 1 wherein: the means for moving the valving means includes elongated tubular means secured to the housing means, rod means located in the tubular means and connected to the valving means, and means mounted on the tubular means and connected to the rod means operable to move the rod means to selectively move the valving means to its open position or closed position.

14. The valve assembly of claim 13 wherein: the means mounted on the tubular means includes a lever, arm means secured to the tubular means, pivot means connecting the lever to the arm means, and means connecting the lever means to the rod means.

15. A valve assembly comprising: housing means having a valving chamber and an inlet opening and outlet opening in communication with the chamber, seat means surrounding one of said openings, said one of said openings having a fluid flow passage with a fluid flow axis, valving means located in said chamber movable generally transverse to the fluid flow axis between an open position allowing fluid to flow through said openings and a closed position in engagement with said seat means to block the flow of fluid through said chamber, means for moving the valving means generally transverse to the fluid flow axis between said open and closed positions thereof, said means for moving the valving means includes rod means connected to the mid-portion of the valving means, means slidably mounting the rod means on the housing means, means connecting the valving means and the rod means including lost motion allowing the valving means to have limited movement relative to said rod means, means connected to the rod means operable to move the rod means to move the valving means between the open and closed positions thereof, rail means in said chamber secured to the housing means, said rail means having first portions inclined towards said one of the openings whereby on movement of the valving means to its closed position the valving means is moved into sealing engagement with said seat means and second portions to allow the valving means to move away from the seat means on transverse movement of the valving means from the closed position to the open position, said valving means having a transverse member, said transverse member having convex surfaces engageable with the rail means allowing limited arcuate movement of the valve means on the rail means and cooperating with the first portions of the rail means to move the valving means into sealing engagement with the seat means, said means connecting the valving means and the rod means being located at the mid-portion of said transverse member.

16. The valve assembly of claim 15 wherein: said seat means is a resilient means secured to said housing.

17. The valve assembly of claim 16 wherein: said resilient means is a sheet of resilient material secured to said housing, and said valving means has a surface engageable with said sheet material when it is in a closed position.

18. The valve assembly of claim 15 wherein: said transverse member extends generally through the mid-section of the valving means.

19. The valve assembly of claim 18 wherein: said member has rounded end sections engageable with the rail means.

20. The valve assembly of claim 15 wherein: said valving means comprises a plate having a surface engageable with said seat means when the valving means is in the closed position.

21. The valve assembly of claim 15 wherein: the means for moving the valving means includes elongated tubular means secured to the housing means, rod means located in the tubular means and connected to the valving means, and means mounted on the tubular means and connected to the rod means operable to move the rod means to selectively move the valving means to its open position or closed position.

22. The valve assembly of claim 21 wherein: the means mounted on the tubular means includes a lever, arm means secured to the tubular means, pivot means connecting the lever to the arm means, and means connecting the lever means to the rod means.

23. A valve assembly comprising: housing means having a valving chamber and an inlet opening and outlet opening in communication with the chamber, said one of said openings having a fluid flow passage with a fluid flow axis, valving means located in said chamber movable generally transverse to the fluid flow axis between an open position allowing fluid to flow through said openings and a closed position to block the flow of fluid through said chamber, rail means located in said chamber and secured to said housing means, said rail means extended generally in the transverse direction of the movement of the valving means for holding the valving means in its closed position, said rail means having incline means directed toward the seat means, said valving means including a transverse member having convex rounded end sections engageable with the rail means allowing limited arcuate movement of the valving means on the rail means, and cooperating with the incline means of the rail means to move the valving means to the closed position, and actuator means for moving the valving means generally transverse to the fluid flow axis between said open and closed positions thereof, and said actuator means including an elongated tubular member having a first end secured to the housing means and a second end located remote from the housing means, rod means slidably located in the tubular member and connected to the mid-portion of the valving means, means connecting the rod means to the mid-portion of the transverse member having lost motion allowing the valving means limited movement relative to seat means when moved from the closed position to the open position, and means mounted on the second end of the tubular member and connected to the rod means operable to move the valving means to its open position or closed position.

24. The valve assembly of claim 23 wherein: the means mounted on the second end of the tubular member includes a lever, arm means secured to the second end of the tubular member, pivot means connecting the lever to the arm means, and means connecting the lever means to the rod means.

25. The valve assembly of claim 24 including: cap means rotatably mounted on said second end of the tubular member, said arm means being secured to the cap means, and releasable lock means for holding the cap means in a fixed position relative to the tubular member.

26. The valve assembly of claim 23 wherein: said member extends generally through the mid-section of the valving means.

* * * * *